US012621907B2

(12) United States Patent
Baek et al.

(10) Patent No.: US 12,621,907 B2
(45) Date of Patent: May 5, 2026

(54) METHOD AND APPARATUS FOR CONTROLLING PACKET DUPLICATION TRANSMISSION IN WIRELESS COMMUNICATION SYSTEM

(71) Applicant: Samsung Electronics Co., Ltd., Suwon-si (KR)

(72) Inventors: Sangkyu Baek, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 18/503,808

(22) Filed: Nov. 7, 2023

(65) Prior Publication Data

US 2024/0073998 A1 Feb. 29, 2024

Related U.S. Application Data

(63) Continuation of application No. 16/906,720, filed on Jun. 19, 2020, now abandoned.

(30) Foreign Application Priority Data

Jun. 24, 2019 (KR) ........................ 10-2019-0075232
Oct. 14, 2019 (KR) ........................ 10-2019-0127272

(51) Int. Cl.
*H04W 80/08* (2009.01)
*H04L 1/1607* (2023.01)
(Continued)

(52) U.S. Cl.
CPC ........... *H04W 80/08* (2013.01); *H04L 1/1614* (2013.01); *H04W 76/27* (2018.02); *H04W 80/02* (2013.01)

(58) Field of Classification Search
CPC . H04W 76/28; H04W 52/0216; H04W 76/15; Y02D 30/70; H04L 5/0098
See application file for complete search history.

(56) References Cited

U.S. PATENT DOCUMENTS 10,448,386 B2 10/2019 Hong et al.
11,026,281 B2 6/2021 Xiao et al.
(Continued)

FOREIGN PATENT DOCUMENTS

CN 108924948 A 11/2018
CN 109151891 A 1/2019
(Continued)

OTHER PUBLICATIONS

3GPP Tsg-Ran WG2 Meeting #106; R2-1906124; Source: ZTE , Sanechips; Title: Consideration on Enhancement of PDCP Duplication; Reno, USA, May 13-May 17, 2019. (Year: 2019).*
(Continued)

*Primary Examiner* — Mohammed S Chowdhury
(74) *Attorney, Agent, or Firm* — Jefferson IP Law, LLP

(57) ABSTRACT

A communication method performed by a terminal communicating in a wireless communication system by using a plurality of radio link control (RLC) entities is provided. The method includes receiving, from a base station, a radio resource control (RRC) message for configuring packet duplication for a radio bearer, configuring at least one RLC entity corresponding to the radio bearer based on the RRC message, and when packet data convergence protocol (PDCP) configuration information is included in the RRC message, configuring a PDCP entity corresponding to the radio bearer based on the PDCP configuration information.

10 Claims, 14 Drawing Sheets

(51) Int. Cl.
H04W 76/27 (2018.01)
H04W 80/02 (2009.01)

(56) References Cited

U.S. PATENT DOCUMENTS

| | | | |
|---|---|---|---|
| 11,831,448 | B2 | 11/2023 | Xu et al. |
| 2018/0199315 | A1 | 7/2018 | Hong et al. |
| 2018/0279168 | A1 | 9/2018 | Jheng et al. |
| 2019/0268799 | A1 | 8/2019 | Hong et al. |
| 2019/0394693 | A1 | 12/2019 | Kim et al. |
| 2020/0029379 | A1 | 1/2020 | Xiao et al. |
| 2020/0236734 | A1* | 7/2020 | Wei ..................... H04W 80/02 |
| 2020/0252330 | A1 | 8/2020 | Wei et al. |
| 2021/0112610 | A1 | 4/2021 | Xiao et al. |
| 2021/0144583 | A1 | 5/2021 | Xiao et al. |
| 2021/0219177 | A1 | 7/2021 | Lu |
| 2021/0297931 | A1* | 9/2021 | Zhang .................. H04W 76/15 |
| 2022/0030616 | A1* | 1/2022 | Xiao ..................... H04W 76/15 |

FOREIGN PATENT DOCUMENTS

| | | |
|---|---|---|
| KR | 10-2018-0081446 A | 7/2018 |
| KR | 10-2019-0143295 A | 12/2019 |

OTHER PUBLICATIONS

3GPP TSG-RAN WG2 Meeting #106; R2-1906364; Source: Intel Corporation; Title: PDCP duplication with multiple RLC entities; Reno, Nevada, USA, May 13-17, 2019 (Year: 2019).*

Fujitsu, PDCP duplication configuration and activation/deactivation, R2-1906255, 3GPP TSG-RAN WG2 Meeting #106, Reno, USA, May 3, 2019.

Samsung, Dynamic Control of PDCP Duplication, R2-1906794, 3GPP TSG-RAN WG2 Meeting #106, Reno, Nevada, USA, May 3, 2019.

Samsung, PDCP Duplication with up to 4 RLCs, R2-1906793, 3GPP TSG-RAN WG2 Meeting #106, Reno, Nevada, USA, May 3, 2019.

Nokia, Stage-2 running CR for support of NR Industrial IoT WI, R2-1908168, 3GPP TSG-RAN WG2 Meeting #107, Prague, Czechia, Jun. 8, 2019.

International Search Report dated Sep. 21, 2020, issued in International Application No. PCT/KR2020/007996.

3GPP TSG-RAN WG2 Meeting #105bis; R2-1903955; Source: Intel Corporation, Title: PDCP duplication with multiple RLC entities, Xi'an, China, Apr. 8-12, 2019 (Year: 2019).

3GPP TSG-RAN WG2 #105; R2-1902174, Source: LG Electronics Inc.; Title: Dynamic control of PDCP duplication leg, Athens, Greece, Feb. 25- Mar. 1, 2019 (Year: 2019).

Chinese Office Action dated May 28, 2024, issued in Chinese Patent Application No. 202080046568.0.

Chinese Office Action dated Nov. 28, 2024, issued in Chinese Application No. 202080046568.0.

Korean Office Action dated Feb. 10, 2025, issued in Korean Application No. 10-2019-0127272.

Chinese Office Action dated Feb. 28, 2025, issued in Chinese Application No. 202080046568.0.

* cited by examiner

RLC ENTITY ACTIVATION          RESERVED BIT 510                    520

METHOD AND APPARATUS FOR CONTROLLING PACKET DUPLICATION TRANSMISSION IN WIRELESS COMMUNICATION SYSTEM

CROSS-REFERENCE TO RELATED APPLICATION(S)

This application is a continuation application of prior application Ser. No. 16/906,720, filed on Jun. 19, 2020, which is based on and claims priority under 35 U.S.C. § 119(a) of a Korean patent application number 10-2019-0075232, filed on Jun. 24, 2019, in the Korean Intellectual Property Office, and of a Korean patent application number 10-2019-0127272, filed on Oct. 14, 2019, in the Korean Intellectual Property Office, the disclosure of each of which is incorporated by reference herein in its entirety.

BACKGROUND

1. Field

The disclosure relates to a method and an apparatus for controlling packet duplication transmission in a wireless communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies, such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies, such as evolved small cells, advanced small cells, cloud radio access networks (cloud RAN), ultra-dense networks, device-to-device (D2D) communication, wireless backhaul, moving networks, cooperative communication, coordinated multipoints (CoMP), and interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements, such as objects exchange information with each other to process the information. Internet of everything (IoE) technology has emerged, in which the IoT technology is combined with, for example, technology for processing big data through connection with a cloud server. To implement the IoT, various technological elements, such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields, such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

Because various services may be provided according to the foregoing and the development of wireless communication systems, methods for smoothly providing services by using packet duplication transmission in wireless communication systems are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below Accordingly, an aspect of the disclosure is to provide an apparatus and method capable of effectively supporting services in a wireless communication system.

Additional aspects will be set forth in part in the description which follows and, in part, will be apparent from the description, or may be learned by practice of the presented embodiments.

In accordance with an aspect of the disclosure, a communication method performed by a terminal communicating in a wireless communication system by using a plurality of radio link control (RLC) entities is provided. The method includes receiving, from a base station, a radio resource control (RRC) message for configuring packet duplication for a radio bearer, configuring at least one RLC entity corresponding to the radio bearer based on the RRC message, and when packet data convergence protocol (PDCP) configuration information is included in the RRC message, configuring a PDCP entity corresponding to the radio bearer based on the PDCP configuration information.

The radio bearer may include a signaling radio bearer (SRB).

The PDCP configuration information may be included in the RRC message when two or more RLC entities associated with the radio bearer are configured based on the RRC message.

The PDCP configuration information may be included in the RRC message when the number of RLC entities associated with the radio bearer is changed based on the RRC message.

The PDCP configuration information may be included in SRB configuration information in the RRC message.

In accordance with another aspect of the disclosure, a method of communication by a base station communicating in a wireless communication system by using a plurality of radio link control (RLC) entities is provided. The method includes transmitting, to a terminal, a radio resource control (RRC) message for configuring packet duplication for a radio bearer, and transmitting, to the terminal, a medium access control (MAC) control element (CE) for controlling activation or deactivation of at least one RLC entity configured based on the RRC message, wherein the RRC message includes packet data convergence protocol (PDCP) configuration information for a PDCP entity corresponding to the radio bearer based on information about the at least one RLC entity related to the radio bearer.

The radio bearer may include a signaling radio bearer (SRB).

The PDCP configuration information may be included in the RRC message if two or more RLC entities associated with the radio bearer are configured based on the RRC message.

The PDCP configuration information may be included in the RRC message if the number of RLC entities associated with the radio bearer is changed based on the RRC message.

The PDCP configuration information may be included in SRB configuration information in the RRC message.

In accordance with another aspect of the disclosure, a terminal communicating in a wireless communication system by using a plurality of radio link control (RLC) entities is provided. The terminal includes a transceiver, and at least one processor coupled with the transceiver and configured to receive, from a base station, a radio resource control (RRC) message for configuring packet duplication for a radio bearer, configure at least one RLC entity corresponding to the radio bearer based on the RRC message, and if packet data convergence protocol (PDCP) configuration information is included in the RRC message, configure a PDCP entity corresponding to the radio bearer based on the PDCP configuration information.

The radio bearer may include a signaling radio bearer (SRB).

The PDCP configuration information may be included in the RRC message if two or more RLC entities associated with the radio bearer are configured based on the RRC message.

The PDCP configuration information may be included in the RRC message if the number of RLC entities associated with the radio bearer is changed based on the RRC message.

The PDCP configuration information may be included in SRB configuration information in the RRC message.

In accordance with another aspect of the disclosure, a base station communicating in a wireless communication system by using a plurality of radio link control (RLC) entities is provided. The base station includes a transceiver, and at least one processor coupled with the transceiver and configured to transmit, to a terminal, a radio resource control (RRC) message for configuring packet duplication for a radio bearer, and transmit, to the terminal, a medium access control (MAC) control element (CE) for controlling activation or deactivation of at least one RLC entity configured based on the RRC message, wherein the RRC message includes packet data convergence protocol (PDCP) configuration information for a PDCP entity corresponding to the radio bearer based on information about the at least one RLC entity related to the radio bearer.

The radio bearer may include a signaling radio bearer (SRB).

The PDCP configuration information may be included in the RRC message if two or more RLC entities associated with the radio bearer are configured based on the RRC message.

The PDCP configuration information may be included in the RRC message if the number of RLC entities associated with the radio bearer is changed based on the RRC message.

The PDCP configuration information may be included in SRB configuration information in the RRC message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
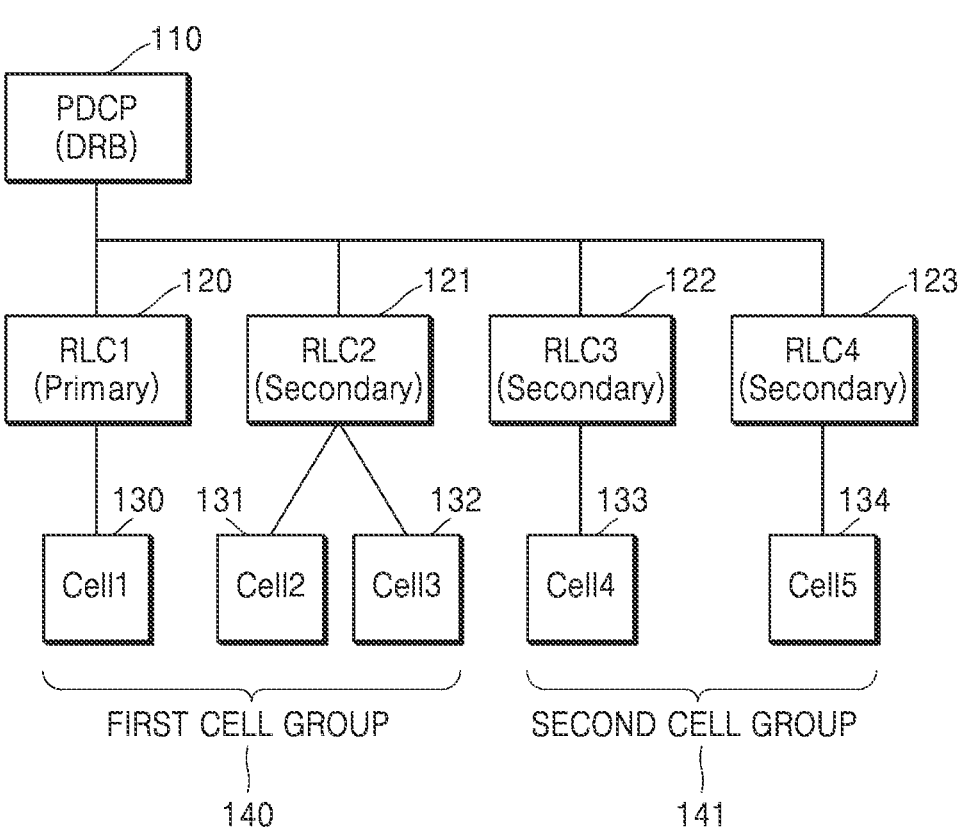
FIG. 1 is a diagram illustrating a structure of a radio bearer configured with packet duplication transmission according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, a base station may be an agent performing terminal resource allocation and may be at least one of a gNode B, an eNode B, a Node B, a base station (BS), a radio access unit, a base station controller, or a node on a network. Examples of a terminal may include a user equipment (UE), a mobile station (MS), a cellular phone, a smartphone, a computer, or a multimedia system capable of performing a communication function. In addition, the term "terminal" may refer to other wireless communication devices in addition to mobile phones, NB-IoT devices, and sensors. However, the base station and the terminal are not limited thereto.

Hereinafter, for convenience of description, the disclosure uses terms and names defined in the $3^{rd}$ Generation Partnership Project Long Term Evolution (3GPP LTE) standards and/or $3^{rd}$ Generation Partnership Project New Radio (NR). However, the disclosure is not limited to these terms and names. In addition, although embodiments of the disclosure will be described below by using an LTE, LTE-Advanced (LTE- A), LTE Pro, or 5G (or NR, next-generation mobile communication) as an example, the embodiments of the disclosure may also be applied to other communication systems having similar technical backgrounds or channel forms. In addition, the embodiments of the disclosure may also be applied to other communication systems through some modifications without departing from the scope of the disclosure by the judgment of those of ordinary skill in the art.

Hereinafter, embodiments of the disclosure will be described with reference to the accompanying drawings.

FIG. 1 is a diagram illustrating a structure of a radio bearer configured with packet duplication transmission according to an embodiment of the disclosure.

The packet duplication transmission may mean duplicating a packet in a transmitter and then transmitting a duplicated packet along multiple paths.

Referring to FIG. 1, in a radio bearer structure, a total of four radio link control (RLC) entities of an RLC1 120, an RLC2 121, an RLC3 122, and an RLC4 123 may be connected to one packet data convergence protocol (PDCP) entity 110 in order to support a plurality of paths. However, how many RLC entities are to be connected to the PDCP entity 110 is not limited to the illustration of FIG. 1, and the number of RLC entities connected to the PDCP entity 110 may be configured by a base station according to the radio link and network structure.

In this case, an entity performing packet duplication may be the PDCP entity 110, and the PDCP entity 110 may perform packet duplication and then transmit a duplicated packet to two or more different RLC entities 120 to 123. In addition, each of the RLC entities 120 to 123 may independently perform packet transmission. Because one radio bearer may have one PDCP entity 110 regardless of packet duplication, the PDCP entity 110 may correspond to one radio bearer identification (ID). In the embodiment of FIG. 1, a radio bearer corresponding to the PDCP entity 110 is illustrated as a data radio bearer (DRB); however, the radio bearer is not limited thereto and may be a signaling radio bearer (SRB).

In addition, according to an embodiment of the disclosure, the RLC entities may be classified into a primary RLC entity 120 and secondary RLC entities 121, 122, and 123 according to purpose. The primary RLC entity may mean an RLC entity that performs at least one of the following two functions. However, the disclosure is not limited to the following examples.

The primary RLC entity may mean an RLC entity that is not deactivated and always performs packet transmission regardless of packet duplication activation.

The primary RLC entity may mean an RLC entity that transmits a PDCP control protocol data unit (PDU). When a PDCP control PDU is not duplicately transmitted, a PDCP control PDU may be transmitted to the primary RLC entity.

In addition, according to an embodiment of the disclosure, the secondary RLC entity may mean an RLC entity that is not the primary RLC entity.

Each of the RLC entities 120 to 123 may have a list of cells available for transmission. When a list of cells is configured, each of the RLC entities 120 to 123 may not transmit an RLC PDU by using all the cells configured in a terminal in a cell group and may transmit an RLC PDU through the cell in the configured cell list. However, the disclosure is not limited thereto. According to some embodiments of the disclosure, a list of cells may be referred to as a 'cell restriction' because it restricts the cells that may be used by an RLC entity or an RLC bearer.

Referring to FIG. 1, the RLC1 120 may use a cell1 130, the RLC2 121 may use a cell2 131 and a cell3 132, the RLC3 122 may use a cell4 133, and the RLC4 123 may use a cell5 134. However, the disclosure is not limited thereto.

According to an embodiment of the disclosure, the cell1 130, the cell2 131, and the cell3 132 may be cells configured in a first cell group 140, and the cell4 133 and the cell5 134 may be cells configured in a second cell group 141. When the first cell group 140 is a master cell group (MCG), the RLC1 120 and the RLC2 121, which are RLC entities that may use the cells of the MCG, may be referred to as MCG RLC, and when the second cell group 141 is a secondary cell group (SCG), the RLC3 122 and the RLC4 123, which are RLC entities that may use the cells of the SCG, may be referred to as an SCG RLC.

According to an embodiment of the disclosure, the RLC and the MAC logical channel may be collectively referred to as an 'RLC bearer', when an RLC bearer is in an MCG, that is, when it includes an MCG RLC, it may be referred to as an MCG RLC bearer, and when an RLC bearer is in an SCG, that is, when it includes an SCG RLC, it may be referred to as an SCG RLC bearer.

When packet duplication transmission is configured and activated, the PDCP entity 110 of the transmitter may transmit a duplicated packet to all of the activated RLC entities among the configured primary RLC entity 120 and the secondary RLC entities 121, 122, and 123. When packet duplication transmission is not performed and a split bearer is applied, the PDCP entity 110 may transmit a packet only to the primary RLC entity 120 when data to be transmitted by the transmitter is equal to or less than (or less than) a particular threshold and may transmit a packet to one of the activated RLC entities among the primary RLC entity 120 and the secondary RLC entities 121, 122, and 123 when the data is more than (or equal to or more than) the particular threshold. The operation described above may be included in at least one of the radio bearer configuration, the RLC configuration, or the PDCP configuration of an RRC configuration message and transmitted to the terminal.

In addition, according to an embodiment of the disclosure, the PDCP entity may be referred to as a PDCP layer or PDCP layer entity, and the RLC entity may be referred to as an RLC layer or an RLC layer entity. However, the disclosure is not limited thereto.

Figure 2:
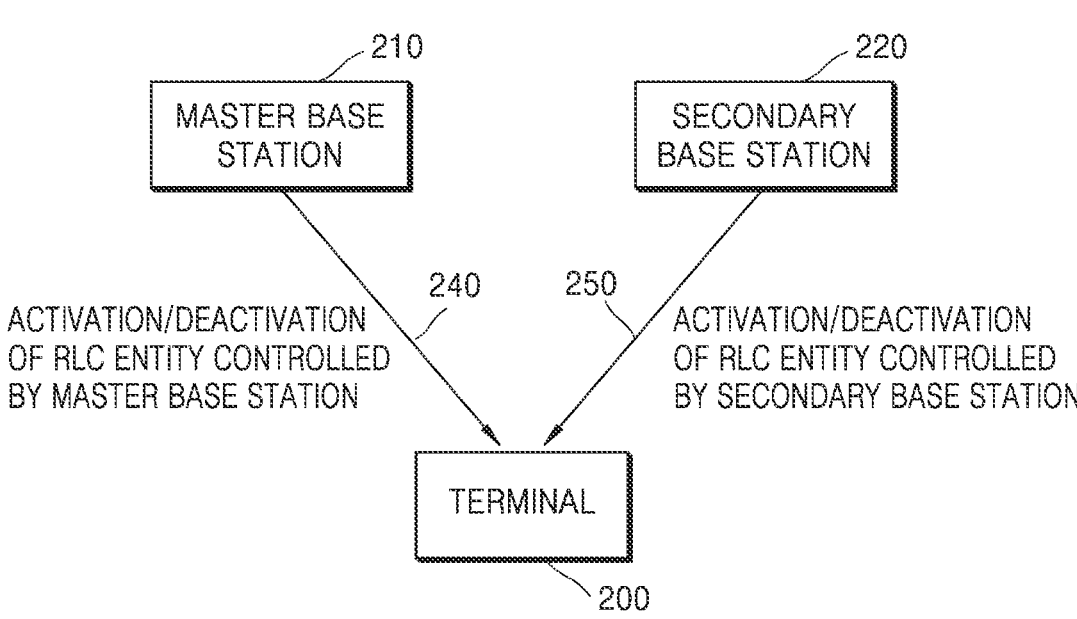
FIG. 2 is a diagram illustrating an activation and deactivation operation of a radio link control (RLC) entity according to an embodiment of the disclosure.

FIG. 2 is a diagram illustrating an activation and deactivation operation of an RLC entity according to an embodiment of the disclosure.

Referring to FIG. 2, in a dual connectivity (DC) structure, a terminal 200 may have a connection state with two network nodes of a master base station (a master gNB (MgNB)) 210 and a secondary base station (a secondary gNB (SgNB)) 220. A cell group managed by the master base station 210 may be a master cell group (MCG), and a cell group managed by the secondary base station 220 may be a secondary cell group (SCG).

According to an embodiment of the disclosure, when a radio bearer configured with packet duplication transmission described in FIG. 1 is configured in a dual connection structure, activation of packet duplication transmission for a radio bearer or activation or deactivation of an RLC entity to be used for packet duplication transmission may be controlled by a particular base station. In other words, for each radio bearer, one of the master base station 210 and the secondary base station 220, or both of the master base station 210 and the secondary base station 220 may control activation and deactivation of packet duplication transmission or activation and deactivation of an RLC entity to be used for packet duplication transmission. Thus, when a radio bearer configured with packet duplication transmission is configured, it may be predetermined which base station is to control packet duplication transmission and activation and deactivation of an RLC entity. Which base station is to control packet duplication and activation and deactivation of an RLC entity may be configured by an RRC configuration message or may be determined by a predetermined rule.

According to an embodiment of the disclosure, activation and deactivation of an MCG RLC bearer may be controlled by a master base station, and activation and deactivation of an SCG RLC bearer may be controlled by a secondary base station. However, the disclosure is not limited thereto.

In the embodiment of FIG. 2, the master base station 210 may transmit an activation and deactivation message 240 of an RLC entity controlled by the master base station 210 to the terminal 200. The terminal 200 may apply activation and deactivation of an RLC entity controlled by the master base station 210. The master base station 210 may include an MCG MAC corresponding to a master node, and the activation and deactivation message 240 transmitted by the master base station 210 may include a MAC control element (CE).

Likewise, the secondary base station 220 may transmit an activation and deactivation message 250 of an RLC entity controlled by the secondary base station 220 to the terminal 200. The terminal 200 may apply activation and deactivation of an RLC entity controlled by the secondary base station 220. The secondary base station 220 may include an SCG MAC corresponding to a secondary node, and the activation and deactivation message 250 transmitted by the secondary base station 220 may include a MAC CE.

Figure 3:
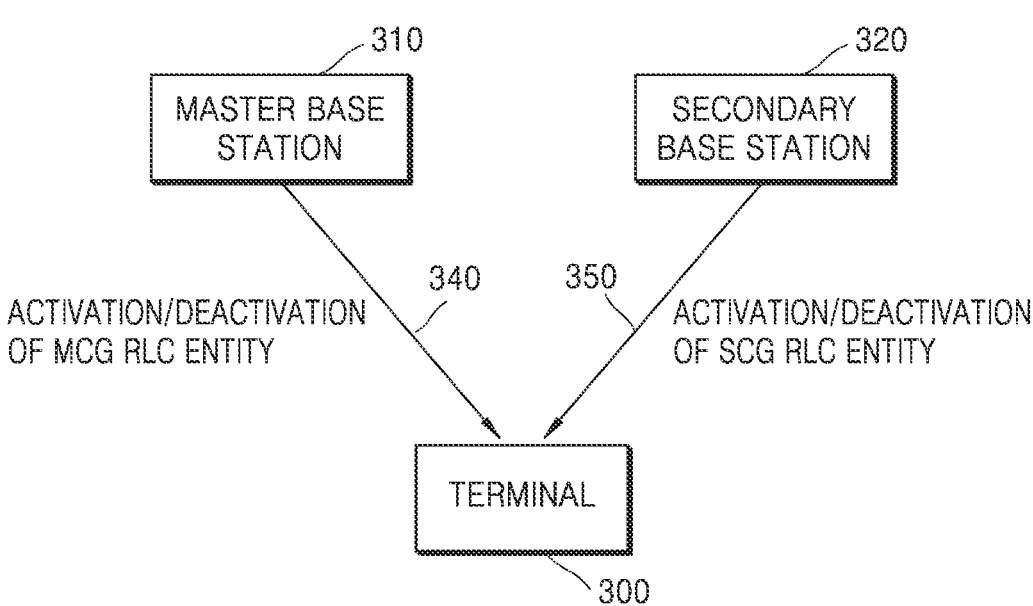
FIG. 3 is a diagram illustrating an operation of activation and deactivation of an RLC entity according to an embodiment of the disclosure.

FIG. 3 is a diagram illustrating an activation and deactivation operation of an RLC entity according to an embodiment of the disclosure.

Referring to FIG. 3, in a DC structure, a terminal 300 may have a connection state with two network nodes of a master base station (a master gNB (MgNB)) 310 and a secondary base station (a secondary gNB (SgNB)) 320. A cell group managed by the master base station 310 may be an MCG, and a cell group managed by the secondary base station 320 may be an SCG.

According to an embodiment of the disclosure, when a radio bearer configured with packet duplication transmission described in FIG. 1 is configured in a dual connection structure, activation of packet duplication transmission for a radio bearer or activation or deactivation of an RLC entity to be used for packet duplication transmission may be controlled by a particular base station. In other words, for each radio bearer, one of the master base station 310 and the secondary base station 320, or both of the master base station 310 and the secondary base station 320 may control activation and deactivation of packet duplication transmission or activation and deactivation of an RLC entity to be used for packet duplication transmission.

Thus, when a radio bearer configured with packet duplication transmission is configured, it may be predetermined which base station is to control packet duplication transmission and activation and deactivation of an RLC entity.

Referring to FIG. 3, activation and deactivation of an MCG RLC bearer may be controlled by the master base station 310, and activation and deactivation of an SCG RLC bearer may be controlled by the secondary base station 320. Because the MCG RLC bearer is connected to the MAC and the RLC entity of the master base station 310, it may be efficient to control activation and deactivation of the corresponding RLC entity in the master base station 310. Likewise, because the SCG RLC bearer is connected to the MAC and the RLC entity of the secondary base station 320, it may be efficient to control activation and deactivation of the corresponding RLC entity in the secondary base station 320. However, the disclosure is not limited thereto.

In the embodiment of FIG. 3, the master base station 310 may transmit an activation and deactivation message 340 of the RLC entity of the MCG RLC bearer to the terminal 300. In this case, the terminal 300 may apply activation and deactivation of the RLC entity of the MCG RLC bearer. The master base station 310 may include an MCG MAC corresponding to a master node, and the activation and deactivation message 340 may include a MAC CE.

Likewise, the secondary base station 320 may transmit an activation and deactivation message 350 of the RLC entity of the SCG RLC bearer to the terminal 300. The terminal 300 may apply activation and deactivation of the RLC entity of the SCG RLC bearer. The secondary base station 320 may include an SCG MAC corresponding to a secondary node, and the activation and deactivation message 350 may include a MAC CE.

Figure 4:
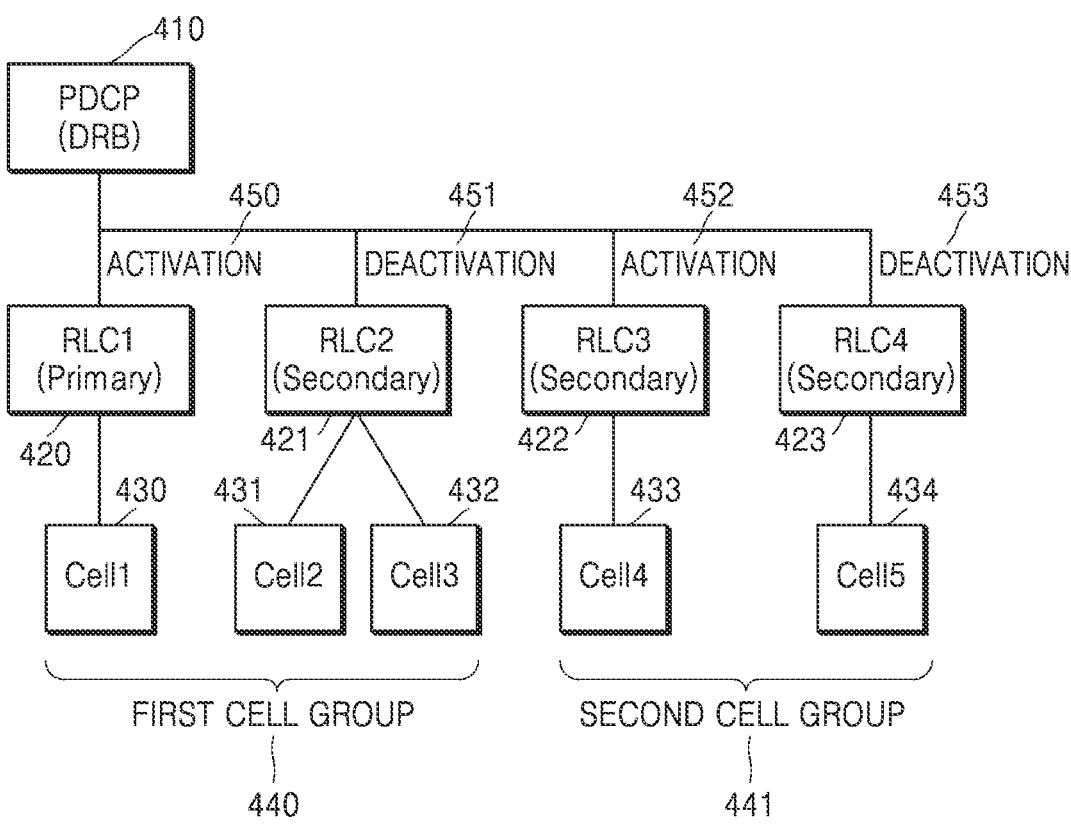
FIG. 4 is a diagram illustrating an operation of activation and deactivation of an RLC entity according to an embodiment of the disclosure.

FIG. 4 is a diagram illustrating activation and deactivation of an RLC entity in a radio bearer configured with packet duplication transmission according to an embodiment of the disclosure.

Referring to FIG. 4, as described in FIG. 1, one PDCP entity 410 may correspond to one radio bearer, and one PDCP entity 410 may be connected to four RLC entities 420, 421, 422, and 423. In addition, the RLC1 420 may be a primary RLC entity, and the RLC2 421, the RLC3 422, and the RLC4 423 may be secondary RLC entities.

In addition, according to an embodiment of the disclosure, the primary RLC entity may mean an RLC entity that performs at least one of the following two functions. However, the disclosure is not limited to the following example.

The primary RLC entity may mean an RLC entity that is not deactivated and always performs packet transmission regardless of packet duplication activation.

The primary RLC entity may mean an RLC entity that transmits a PDCP control PDU. When a PDCP control PDU is not duplicately transmitted, a PDCP control PDU may be transmitted to the primary RLC entity.

In addition, according to an embodiment of the disclosure, the secondary RLC entity may mean an RLC entity that is not the primary RLC entity. However, the disclosure is not limited thereto, and the primary RLC entity and the secondary RLC entity may not be distinguished from each other. Each of the RLC entities 420 to 423 may have a list of cells available for transmission. When a list of cells is configured, each of the RLC entities 420 to 423 may not transmit an RLC PDU by using all the cells configured in a terminal in a cell group and may transmit an RLC PDU through the cell in the configured cell list. However, the disclosure is not limited thereto. Referring to FIG. 4, the RLC1 420 may use a cell1 430, the RLC2 421 may use a cell2 431 and a cell3 432, the RLC3 422 may use a cell4 433, and the RLC4 423 may use a cell5 434. The cell1 430, the cell2 431, and the cell3 432 may be a first cell group 440, and the cell4 433 and the cell5 434 may be cells configured in a second cell group 441.

According to an embodiment of the disclosure, each RLC bearer of a radio bearer configured with packet duplication transmission may be activated or deactivated. As described in FIGS. 2 and 3, each RLC bearer of a radio bearer configured with packet duplication transmission may be activated or deactivated by an activation or deactivation message transmitted by a base station controlling activation or deactivation of each RLC bearer.

Referring to FIG. 4, the RLC1 420 and the RLC3 422 are activated (450 and 452), and the RLC2 421 and the RLC4 434 are deactivated (451 and 453). In the radio bearer configured with packet duplication transmission, a PDCP PDU to be transmitted by the PDCP entity 410 may be duplicated and then each of the duplicated PDCP PDUs may be transmitted to the RLC entity 420 or 422 of the activated RLC bearer to perform independent transmission.

According to an embodiment of the disclosure, when packet duplication transmission is activated, the PDCP entity 410 of the terminal may duplicate a PDU that is PDCP data and then transmit the same to the activated RLC entity. When packet duplication transmission is deactivated, the PDCP entity 410 may not duplicate a PDCP PDU and may transmit the same to the primary RLC entity 420.

For example, in the case of the PDCP control PDU, the PDCP entity 410 may transmit the same to the primary RLC 420. When packet duplication transmission of the PDCP control PDU is configured, the PDCP control PDU may be duplicated in the PDCP entity 410 and transmitted to the activated RLC bearer. The packet duplication transmission of the PDCP control PDU may be configured by an RRC configuration message of the base station. However, the disclosure is not limited thereto.

Figure 5:
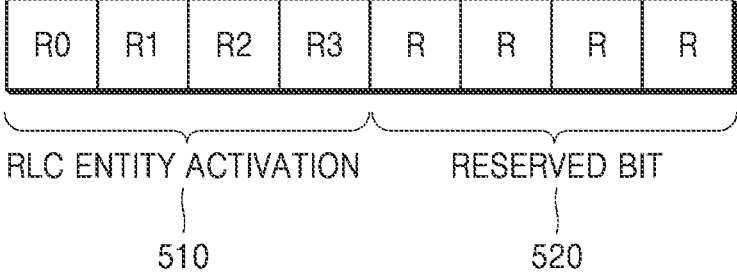
FIG. 5 is a diagram illustrating a format of a message for controlling activation and deactivation of an RLC bearer of a radio bearer configured with packet duplication transmission according to an embodiment of the disclosure.

FIG. 5 is a diagram illustrating a format of a message for controlling activation and deactivation of an RLC bearer of a radio bearer configured with packet duplication transmission according to an embodiment of the disclosure.

The message of FIG. 5 for controlling activation and deactivation of an RLC bearer of a radio bearer configured with packet duplication transmission is represented in a MAC CE format; however, it may be a message in another format and is not limited to the format illustrated in FIG. 5. The message of FIG. 5 for controlling activation and deactivation of the RLC bearer may include 1 byte (8 bits) and may be a MAC CE for controlling activation and deactivation of an RLC bearer for one radio bearer.

Referring to FIG. 5, according to an embodiment of the disclosure, the MAC CE may include a bitmap 510 for each RLC bearer or the corresponding RLC entity. Each bit of the bitmap 510 may mean activation and deactivation of each RLC bearer. For example, when a certain bit in the bitmap 510 has a value of 1, the corresponding RLC bearer may be activated, and when it has a value of 0, the corresponding RLC bearer may be deactivated.

According to an embodiment of the disclosure, an Ri bit of the bitmap may mean a bit representing activation or deactivation of the (i)th RLC bearer. The order of the RLC bearer may be configured by an RRC configuration message or the like or may be determined by a logical channel ID of the RLC bearer and a cell group to which the RLC bearer belongs. The order of the RLC bearer may be determined by one of the following rules. However, the disclosure is not limited to the following examples.

The ascending (or descending) order of a logical channel ID for an RLC bearer belonging to a cell group where the corresponding activation and deactivation MAC CE is transmitted The ascending (or descending) order of a logical channel ID for an MCG RLC bearer, and the ascending (or descending) order of a logical channel ID for a subsequent SCG RLC bearer The ascending (or descending) order of a logical channel ID for an RLC bearer the activation and deactivation of which is controlled by the corresponding activation and deactivation MAC CE; when the logical channel ID is the same, an MCG RLC bearer takes precedence The ascending (or descending) order of a logical channel ID for an MCG RLC bearer the activation and deactivation of which is controlled by the corresponding activation and deactivation MAC CE, and the ascending (or descending) order of a logical channel ID for an SCG RLC bearer the activation and deactivation of which is controlled by the corresponding subsequent activation and deactivation MAC CE When the terminal receives the Ri bit for the RLC bearer that is not controlled by the base station that has transmitted the MAC CE, the corresponding Ri bit may be ignored. In addition, the message of FIG. 5 may include a reserved bit 520, which may be an unused bit for adjusting the size of the message in units of bytes (e.g., multiples of 8 bits); however, the disclosure is not limited thereto. For example, the reserved bit 520 may include information other than the Ri bit for activation and deactivation of the RLC bearer. However, the disclosure is not limited thereto.

Figure 6:
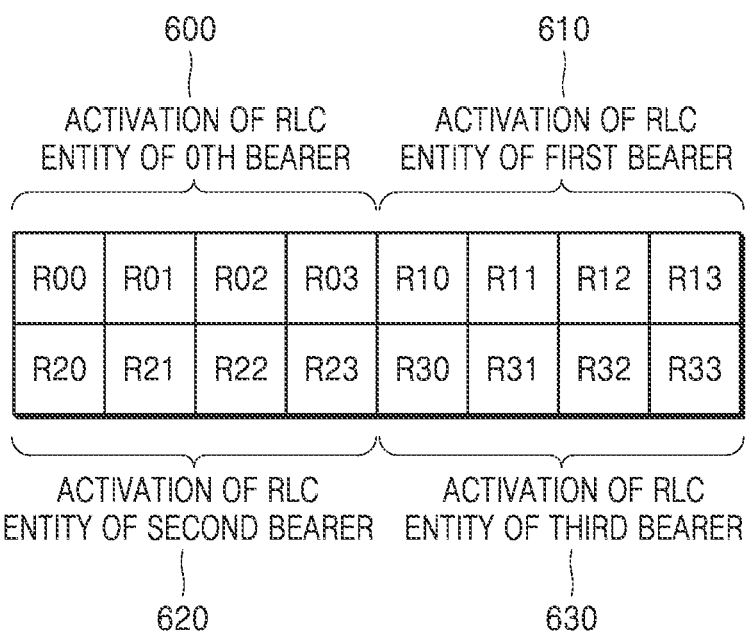
FIG. 6 is a diagram illustrating a format of a message for controlling activation and deactivation of an RLC bearer of a radio bearer configured with packet duplication transmission according to an embodiment of the disclosure.

FIG. 6 is a diagram illustrating a format of a message for controlling activation and deactivation of an RLC bearer of a radio bearer configured with packet duplication transmission according to an embodiment of the disclosure.

Referring to FIG. 6, the message for controlling activation and deactivation of an RLC bearer of a radio bearer configured with packet duplication transmission is represented in a MAC CE format; however, it may be a message of another format and is not limited to the format illustrated in FIG. 6. In the message of FIG. 6, it may include 2 bytes (16 bits) and may be a MAC CE that controls activation and deactivation of an RLC bearer for four radio bearers.

Referring to FIG. 6, according to an embodiment of the disclosure, the MAC CE may include bitmaps 600, 610, 620, and 630 for each RLC bearer or the corresponding RLC entity. Each bit of the bitmaps 600 to 630 may mean activation and deactivation of each RLC bearer. For example, when a certain bit in the bitmaps 600 to 630 has a value of 1, the corresponding RLC bearer may be activated, and when it has a value of 0, the corresponding RLC bearer may be deactivated.

According to an embodiment of the disclosure, an Rij bit of the bitmap may mean a bit representing activation or deactivation of the (j)th RLC bearer of the (i)th radio bearer. The order of the radio bearer and the order of the RLC bearer may be configured by an RRC configuration message or the like or may be determined by a DRB ID or a logical channel ID of the RLC bearer and a cell group to which the RLC bearer belongs.

According to an embodiment of the disclosure, the order of a radio bearer configured with packet duplication transmission may be determined by one of the following rules. However, the disclosure is not limited to the following examples.

The ascending (or descending) order of the DRB ID of the radio bearer configured with packet duplication transmission The ascending (or descending) order of the DRB ID of the radio bearer in which at least one RLC bearer (or RLC entity) among the radio bearers configured with packet duplication transmission belongs to the cell group where the corresponding MAC CE is transmitted The ascending (or descending) order of the DRB ID of the radio bearer in which the activation and deactivation of at least one RLC bearer (or RLC entity) among the radio bearers configured with packet duplication transmission is controlled by the corresponding MAC CE According to an embodiment of the disclosure, the order of the RLC bearer may be determined by one of the following rules. However, the disclosure is not limited to the following examples.

The ascending (or descending) order of a logical channel ID for an RLC bearer belonging to a cell group where the corresponding activation and deactivation MAC CE is transmitted The ascending (or descending) order of a logical channel ID for an MCG RLC bearer, and the ascending (or descending) order of a logical channel ID for a subsequent SCG RLC bearer The ascending (or descending) order of a logical channel ID for an RLC bearer the activation and deactivation of which is controlled by the corresponding activation and deactivation MAC CE; when the logical channel ID is the same, an MCG RLC bearer takes precedence The ascending (or descending) order of a logical channel ID for an MCG RLC bearer the activation and deactivation of which is controlled by the corresponding activation and deactivation MAC CE, and the ascending (or descending) order of a logical channel ID for an SCG RLC bearer the activation and deactivation of which is controlled by the corresponding subsequent activation and deactivation MAC CE When the terminal receives the Rij bit for the RLC bearer that is not controlled by the base station that has transmitted the MAC CE, the corresponding Ri bit may be ignored.

In the embodiment of FIG. 6, as an example, four RLC bearers of a radio bearer configured with packet duplication transmission are activated or deactivated. However, unlike the example of FIG. 6, a bitmap for a radio bearer configured with packet duplication transmission may be included. In addition, in other embodiments of the disclosure, the number of RLC bearers the activation and deactivation of which is controlled by the MAC CE may vary. For example, there may be at least one RLC bearer the activation and deactivation of which is controlled by the MAC CE, and a bitmap for a radio bearer connected to at least one RLC bearer may vary. When the number of radio bearers having an RLC bearer the activation and deactivation of which is controlled by the MAC CE is variable or the number of RLC bearers is variable, because the MAC CE has a variable length, a length (L) field may be included in a MAC subheader.

According to an embodiment of the disclosure, when it may be clearly determined which radio bearer configured with packet duplication transmission is controlled by the corresponding MAC CE, the length of the corresponding MAC CE may be accurately determined. In this case, a separate L field may not be required. For example, in the embodiment of FIG. 6, when the activation and deactivation of the RLC bearer should be controlled by the MAC CE with respect to a total of 4 radio bearers, the length of the corresponding MAC CE may be 2 bytes and thus the L bit may not be required. In this case, the L field may be the MAC CE that is not included in the MAC subheader. In addition, the MAC CE of FIG. 6 may also include the reserved bit 520 illustrated in FIG. 5, which may be an unused bit for adjusting the size of the message for controlling activation and deactivation of the RLC bearer in units of bytes (e.g., multiples of 8 bits).

Figure 7:
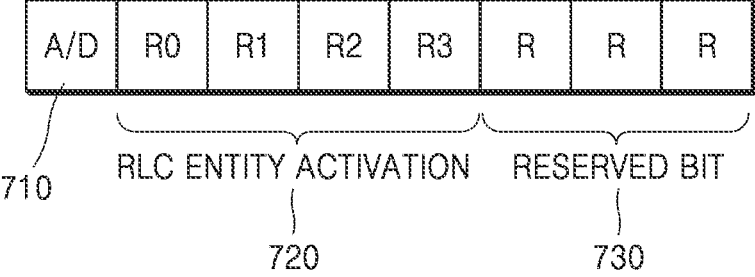
FIG. 7 is a diagram illustrating an format of a message for controlling activation and deactivation of an RLC bearer of a radio bearer configured with packet duplication transmission according to an embodiment of the disclosure.

FIG. 7 is a diagram illustrating a format of a message for controlling activation and deactivation of an RLC bearer of a radio bearer configured with packet duplication transmission according to an embodiment of the disclosure.

Referring to FIG. 7, the message for controlling activation and deactivation of an RLC bearer of a radio bearer configured with packet duplication transmission is represented in a MAC CE format; however, it may be a message of another format and is not limited to the format illustrated in FIG. 7. The message of FIG. 7 for controlling activation and deactivation of the RLC bearer may include 1 byte (8 bits) and may be a MAC CE for controlling activation and deactivation of an RLC bearer for one radio bearer.

Referring to FIG. 7, according to an embodiment of the disclosure, the MAC CE may include an activation/deactivation (A/D) bit 710 indicating activation and deactivation of packet duplication transmission of a radio bearer, and a bitmap 720 for each RLC bearer or the corresponding RLC entity.

According to an embodiment of the disclosure, the A/D bit 710 may indicate activation or deactivation of a packet duplication transmission function. For example, when the A/D bit 710 has a value of 1, packet duplication transmission may be activated, and when it has a value of 0, packet duplication transmission may be deactivated. When packet duplication transmission is activated, the PDCP entity may duplicate the PDCP PDU and then transmit the duplicated PDCP PDU to the RLC entity of the activated RLC bearer. When packet duplication transmission is deactivated, an operation of deactivating packet duplication transmission may be performed.

In addition, according to an embodiment of the disclosure, the bitmap 720 for each RLC bearer or the corresponding RLC entity may mean activation or deactivation of each RLC bearer; for example, when a certain bit in the bitmap 720 has a value of 1, the corresponding RLC bearer may be activated, and when it has a value of 0, the corresponding RLC bearer may be deactivated.

According to an embodiment of the disclosure, the Ri bit of the bitmap may mean a bit representing activation or deactivation of the (i)th RLC bearer. The order of the RLC bearer may be configured by an RRC configuration message or the like or may be determined by a logical channel ID of the RLC bearer and a cell group to which the RLC bearer belongs. The order of the RLC bearer may be determined by one of the following rules. However, the disclosure is not limited to the following examples.

The ascending (or descending) order of a logical channel ID for an RLC bearer belonging to a cell group where the corresponding activation and deactivation MAC CE is transmitted The ascending (or descending) order of a logical channel ID for an MCG RLC bearer, and the ascending (or descending) order of a logical channel ID for a subsequent SCG RLC bearer The ascending (or descending) order of a logical channel ID for an RLC bearer the activation and deactivation of which is controlled by the corresponding activation and deactivation MAC CE; when the logical channel ID is the same, an MCG RLC bearer takes precedence The ascending (or descending) order of a logical channel ID for an MCG RLC bearer the activation and deactivation of which is controlled by the corresponding activation and deactivation MAC CE, and the ascending (or descending) order of a logical channel ID for an SCG RLC bearer the activation and deactivation of which is controlled by the corresponding subsequent activation and deactivation MAC CE In addition, according to an embodiment of the disclosure, the primary RLC bearer may be always activated and thus may not have a corresponding bit value, and the Ri field may correspond only to the secondary RLC bearer. When the terminal receives the Ri bit for the RLC bearer that is not controlled by the base station that has transmitted the corresponding MAC CE, the corresponding Ri bit may be ignored. In addition, referring to FIG. 7, the MAC CE may include a reserved bit 730, which may be an unused bit for adjusting the size of the message in units of bytes (e.g., multiples of 8 bits). However, the disclosure is not limited thereto. For example, the reserved bit 730 may include information other than the Ri bit for activation and deactivation of the RLC bearer. However, the disclosure is not limited thereto.

Figure 8:
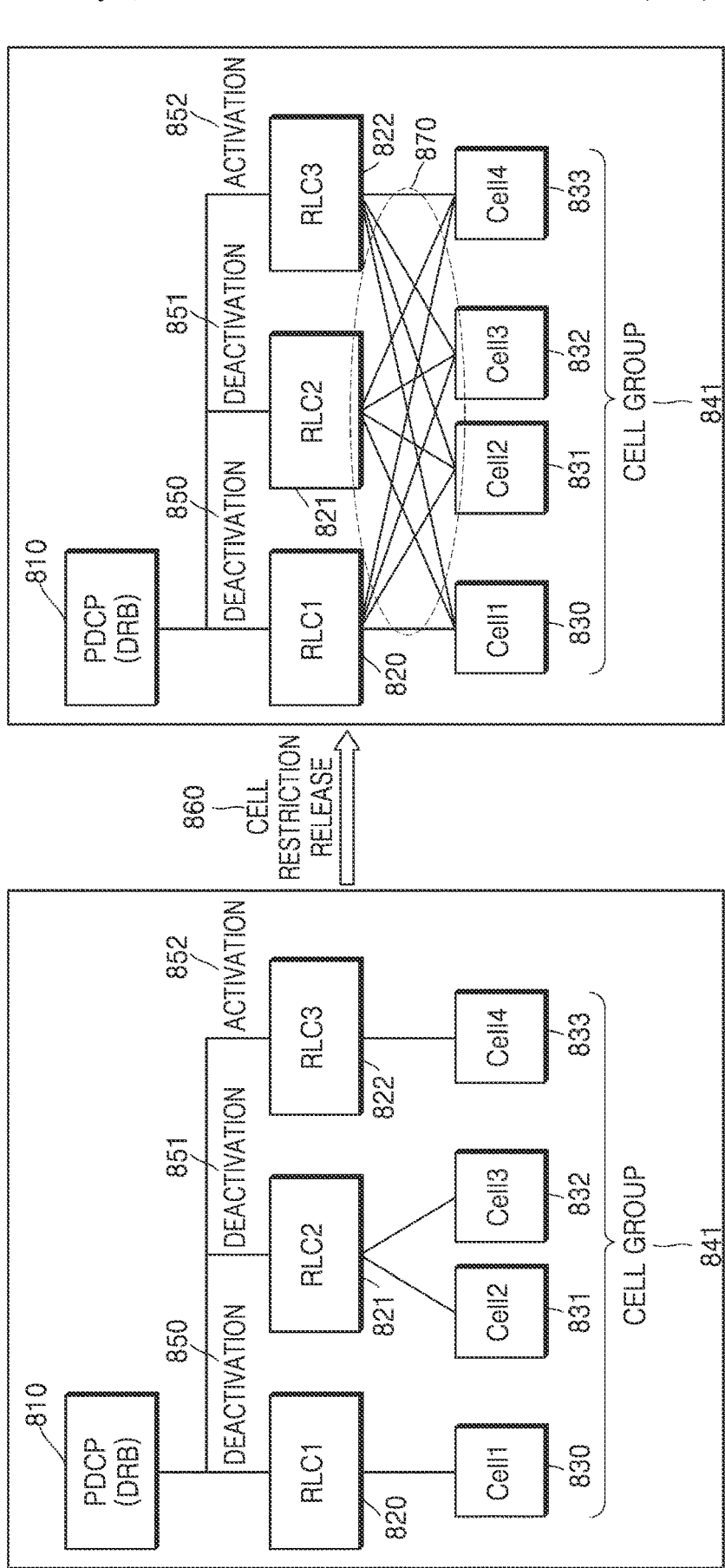
FIG. 8 is a diagram illustrating an operation of releasing a cell restriction of packet duplication transmission according to an embodiment of the disclosure.

FIG. 8 is a diagram illustrating an operation of releasing a cell restriction of packet duplication transmission according to an embodiment of the disclosure.

As described above, for packet duplication transmission, each RLC entity or an RLC bearer may have a list of available cells, that is, a cell restriction. Due to the cell restriction, it may be possible to prevent the same duplicate packet from being transmitted in the same cell at the same time through different RLC entities.

Referring to FIG. 8, one radio bearer configured with packet duplication transmission is illustrated, and three RLC entities 820, 821, and 822 may be connected to one PDCP entity 810 to use packet duplication transmission. However, the disclosure is not limited to the example of FIG. 8, and the number of RLC entities connected to one PDCP entity is not restricted. In addition, referring to FIG. 8, the RLC1 820 may use a cell1 830, the RLC2 821 may use a cell2 831 and a cell3 832, and the RLC3 822 may use a cell4 833. In addition, all the cells in FIG. 8 may be configured in the same cell group 841.

According to an embodiment of the disclosure, when only one RLC bearer is activated in one cell group for a radio bearer configured with packet duplication transmission, only one packet among the duplicated packets may be transmitted in the corresponding cell group. In this case, even when the cell restriction is released, the duplicated packet may not be transmitted to the same cell at the same time. In the disclosure, when only one RLC bearer (or RLC entity) is activated in the same cell group among the RLC bearers (or RLC entities) of the radio bearer configured with packet duplication transmission, the restriction of available cells may be released.

Referring to FIG. 8, only the RLC3 822 is activated (852), and the RLC1 820 and the RLC2 821 are deactivated (850 and 851). That is, only one RLC bearer is activated in the cell group 841 (only the RLC3 822 is activated). In this case, because the above cell restriction release condition is satisfied, the cell restriction may be released (860).

According to an embodiment of the disclosure, when the cell restriction is released, a cell list available to the RLC entity may not be restricted. Referring to FIG. 8, all the cells 830, 831, 832, and 833 in which the RLC1 820, the RLC2 821, and the RLC3 822 are configured may be used (870) because the cell restriction is released.

In addition, according to an embodiment of the disclosure, when the cell restriction is released, the RLC bearers for the same radio bearer may be used for a union cell of the cell list of the RLC bearer. In other words, when the cell restriction is released, the cell1 830, the cell2 831, the cell3 832, and the cell4 833, which are a union of the cell1 830 that is the available cell of the RLC1 820, the cell2 831 and the cell3 832 that are the available cells of the RLC2 821, and the cell4 833 that is the available cell of the RLC3 822, may be used. Thereafter, when two or more RLC bearers are activated again, the original cell restriction may be applied.

Figure 9:
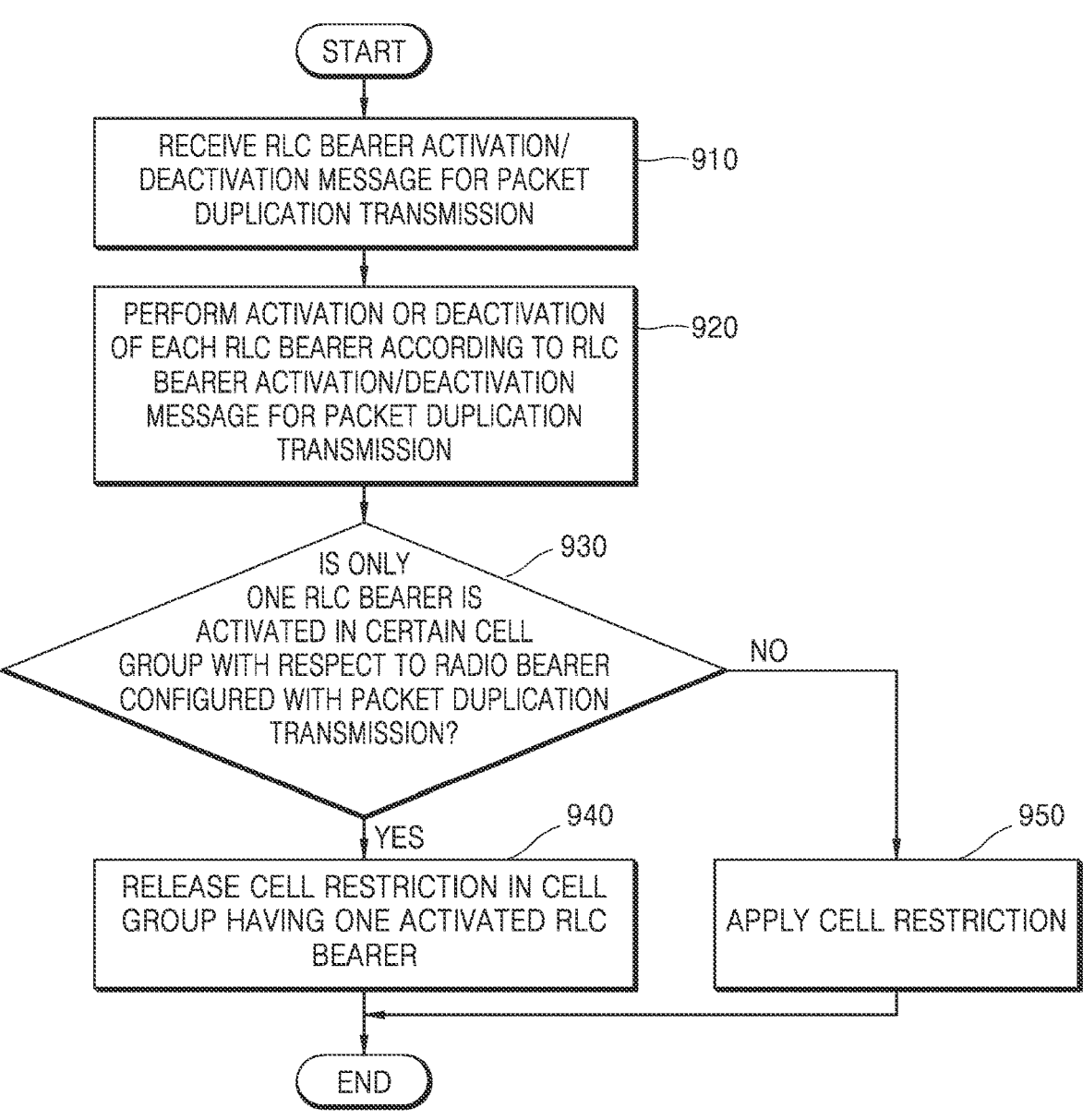
FIG. 9 is a diagram illustrating a detailed process of releasing a cell restriction of packet duplication transmission according to an embodiment of the disclosure.

FIG. 9 is a diagram illustrating a process of releasing a cell restriction of packet duplication transmission according to an embodiment of the disclosure.

When a radio bearer configured with packet duplication transmission is included in the connection configuration between the terminal and the base station, it may be determined by an activation and deactivation message for packet duplication transmission whether to activate an RLC bearer or whether to activate packet duplication transmission.

Referring to FIG. 9, in operation 910, the terminal may receive an activation or deactivation message of the RLC bearer for packet duplication transmission. In operation 920, the terminal may perform activation or deactivation of the RLC bearer or the RLC entity based on the activation or deactivation message of the RLC bearer received in operation 910.

In operation 930, the terminal may determine whether to release the cell restriction for the radio bearer configured with packet duplication transmission, according to whether only one RLC bearer is activated in the same cell group.

In operation 940, when only one RLC bearer is activated in the same cell group, the terminal may release the cell restriction of the RLC bearer of the cell group having one activated RLC bearer. In this case, an RLC bearer not applying the cell restriction may be an RLC bearer of the radio bearer that is configured with packet duplication transmission and has only one activated RLC bearer in the cell group.

In addition, according to an embodiment of the disclosure, when the cell restriction is released, the RLC bearers for the same radio bearer may be used for a union cell of the cell list of the RLC bearer configured in the same cell group. In other words, when the cell restriction is released in the embodiment of FIG. 8, the Cell1 830, Cell2 831, Cell3 832, and Cell4 833, which is a union of the Cell 1 830 that is an available cell of the RLC1 820, the Cell2 831 and Cell3 832 that are available cells of the RLC2 821, and the Cell4 833 that is an available cell of the RLC3 822, may be used.

In operation 950, when two or more RLC bearers are activated for the radio bearer configured with packet duplication transmission, the terminal may perform packet duplication transmission by applying the originally configured cell restriction.

In some embodiments of the disclosure, an operation of releasing the cell restriction of the RLC bearer of the cell group when only one RLC bearer is activated in the same cell group described above may be applied only to a case where all RLC bearers of the corresponding DRB are configured in the same cell group. However, in other embodiments of the disclosure, an operation of releasing the cell restriction of the RLC bearer of the cell group when only one RLC bearer is activated in the same cell group described above may be applied only to a case where two or more RLC bearers configured in the corresponding DRB are configured in the cell group.

Figure 10:
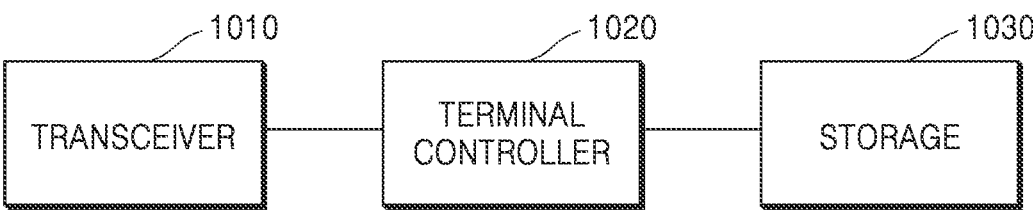
FIG. 10 is a block diagram illustrating an internal structure of a terminal according to an embodiment of the disclosure.

FIG. 10 is a block diagram illustrating a structure of a terminal according to an embodiment of the disclosure.

Referring to FIG. 10, the terminal may include a transceiver 1010, a controller 1020, and a storage 1030. However, the disclosure is not limited thereto, and the terminal may include more components or less components than the components of FIG. 10. In addition, the transceiver 1010, the controller 1020, and the storage 1030 may be implemented as a single chip.

According to an embodiment of the disclosure, the controller 1020 may include a circuit or an application-specific integrated circuit or at least one processor but is not limited thereto.

According to an embodiment of the disclosure, the controller 1020 may control a series of processes such that the terminal may operate according to the above embodiment of the disclosure. In an embodiment of the disclosure, the controller 1020 may receive an activation control message of an RLC bearer for packet duplication transmission, control activation of at least one RLC bearer based on the received activation control message of the RLC bearer, determine whether only one RLC bearer among at least one RLC bearer corresponding to a certain cell group is activated, and based on the determination result, determine whether to release a cell restriction of the cell group. The RLC bearer activation control message may include information for controlling activation and deactivation of the RLC bearer, and the RLC bearer activation control message may include information for controlling activation and deactivation of the packet duplication transmission function as described above. In relation to the above operations, only some operations of the above embodiments of the disclosure are described as an example; however, the disclosure is not limited thereto and the controller 1020 may control all processes such that the terminal may operate according to all or some of the above embodiments of the disclosure. The transceiver 1010 may transmit or receive signals to or from other network entities. For example, the transceiver 1010 may receive system information from the base station and may receive a synchronization signal or a reference signal therefrom. In addition, the signals transmitted or received to or from the base station or the network entity may include control information and data. For this purpose, the transceiver 1010 may include, for example, an RF transmitter for up-converting and amplifying a transmitted signal and an RF receiver for low-noise-amplifying and down-converting a received signal. However, this is merely an embodiment of the transceiver 1010, and the components of the transceiver 1010 are not limited to the RF transmitter and the RF receiver. In addition, the transceiver 1010 may receive a signal through a radio channel and output the signal to the controller 1020 and may transmit a signal output from the controller 1020, through a radio channel.

The storage 1030 may store at least one of information transmitted or received through the transceiver 1010 or information generated through the controller 1020. The storage 1030 may store programs and data necessary for the operation of the terminal. In addition, the storage 1030 may store control information or data included in the signals obtained by the terminal. The storage 1030 may include a storage medium or a combination of storage media, such as read only memory (ROM), random access memory (RAM), hard disk, compact disc (CD)-ROM, and digital versatile disc (DVD). In addition, the storage 1030 may include a plurality of memories.

Figure 11:
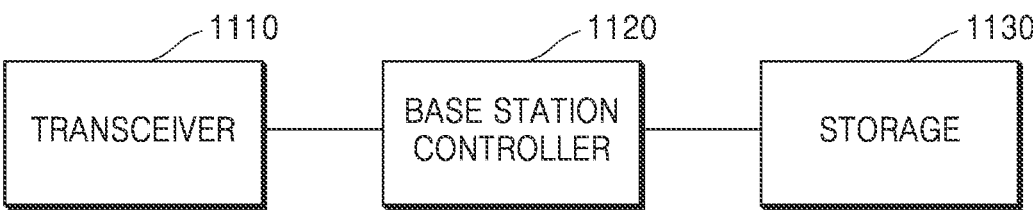
FIG. 11 is a block diagram illustrating a configuration of a base station according to an embodiment of the disclosure.

FIG. 11 is a block diagram illustrating a structure of a base station according to an embodiment of the disclosure.

Referring to FIG. 11, the base station may include a transceiver 1110, a controller 1120, and a storage 1130. However, the disclosure is not limited thereto, and the base station may include more components or less components than the components of FIG. 11. In addition, the transceiver 1110, the controller 1120, and the storage 1130 may be implemented as a single chip.

According to an embodiment of the disclosure, the controller 1120 may include a circuit or an application-specific integrated circuit or at least one processor but is not limited thereto.

According to an embodiment of the disclosure, the controller 1120 may control a series of processes such that the base station may operate according to the above embodiment of the disclosure. In an embodiment of the disclosure, the controller 1120 may transmit an RLC bearer activation control message for duplication transmission of the terminal. The RLC bearer activation control message may include information for controlling activation and deactivation of the RLC bearer, and the RLC bearer activation control message may include information for controlling activation and deactivation of the packet duplication transmission function as described above. In addition, the controller 1120 may provide the terminal with configuration information for activating a packet duplication transmission function. In relation to the above operations, only some operations of the above embodiments of the disclosure are described as an example; however, the disclosure is not limited thereto and the controller 1120 may control all processes such that the base station may operate according to all or some of the above embodiments of the disclosure. For example, the controller 1120 may perform all or some of the operations performed by the terminal and may perform operations corresponding to the above operations of the terminal.

The transceiver 1110 may transmit or receive signals to or from other network entities. For example, the transceiver 1110 may transmit system information to the terminal and may transmit a synchronization signal or a reference signal thereto. In addition, the signals transmitted or received to or from the terminal or the network entity may include control information and data. For this purpose, the transceiver 1110 may include, for example, an RF transmitter for up-converting and amplifying a transmitted signal and an RF receiver for low-noise-amplifying and down-converting a received signal. However, this is merely an embodiment of the transceiver 1110, and the components of the transceiver 1110 are not limited to the RF transmitter and the RF receiver. In addition, the transceiver 1110 may receive a signal through a radio channel and output the signal to the controller 1120 and may transmit a signal output from the controller 1120, through a radio channel.

The storage 1130 may store at least one of information transmitted or received through the transceiver 1110 or information generated through the controller 1120. The storage 1130 may store programs and data necessary for the operation of the base station. In addition, the storage 1130 may store control information or data included in the signals obtained by the network entity. The storage 1130 may include a storage medium or a combination of storage media, such as ROM, RAM, hard disk, CD-ROM, and DVD. In addition, the storage 1130 may include a plurality of memories.

Figure 12:
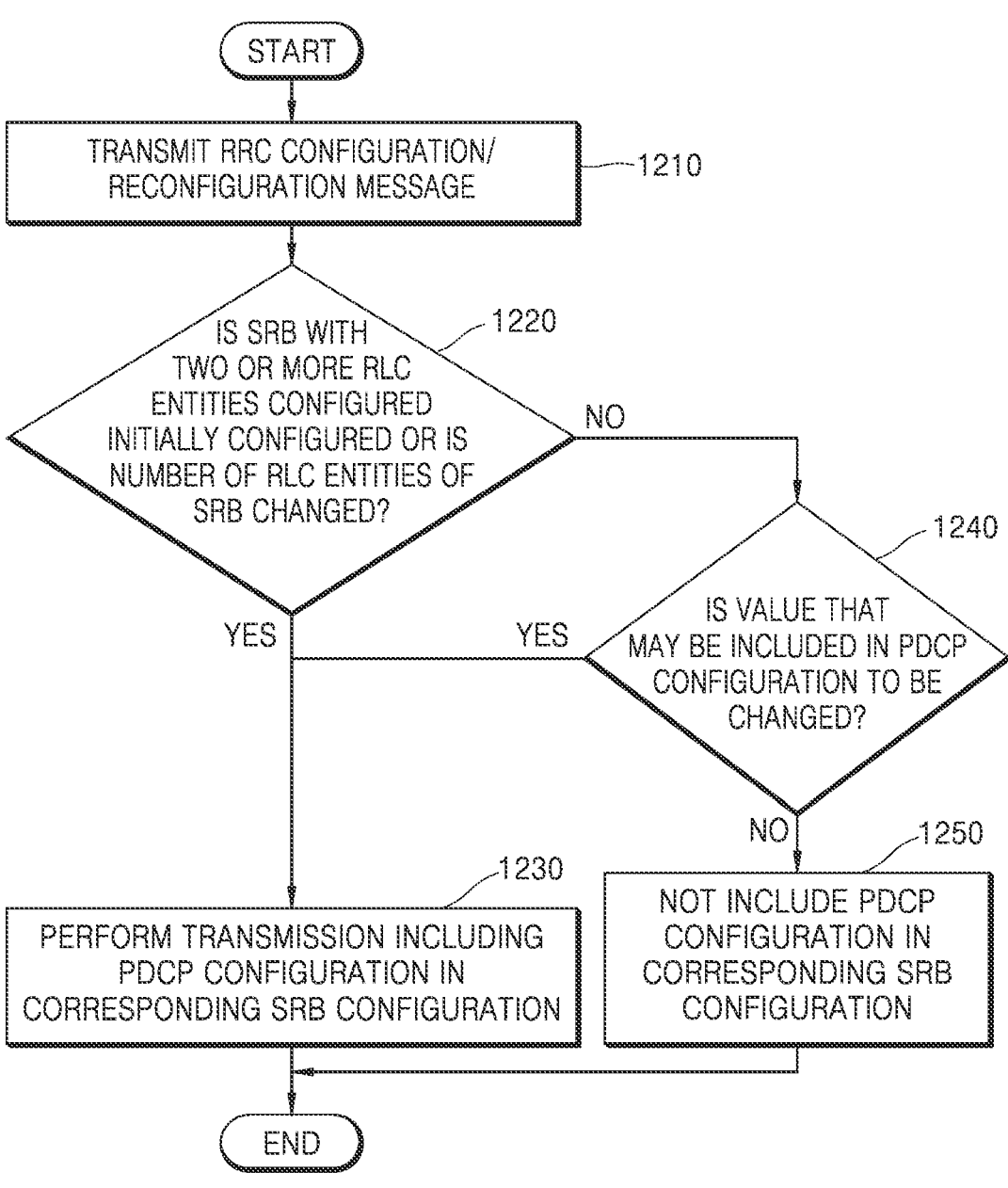
FIG. 12 illustrates an operation of transmitting packet data convergence protocol (PDCP) configuration information of a signaling radio bearer (SRB) according to an embodiment of the disclosure.

FIG. 12 illustrates an operation of transmitting PDCP configuration information for an SRB according to an embodiment of the disclosure.

Referring to FIG. 12, radio bearers in which data is transmitted in a radio access network (RAN) meaning transmission between the base station and the terminal may be classified into SRBs and DRBs in which control information is transmitted, and packet duplication transmission may be configured for each radio bearer. However, two or more RLC entities should be configured with the corresponding radio bearer in order to perform packet duplication transmission. Thereafter, in order to perform actual packet duplication, two or more RLC entities should be activated to duplicately transmit the same packet to two or more RLC entities. Which RLC entity is to be activated may be configured to the terminal by the base station through an RRC configuration (setup) or reconfiguration message. In order to perform packet duplication transmission, it may be necessary to configure which RLC entity is a primary RLC entity. The primary RLC entity may be an RLC entity used to transmit a PDCP control PDU, may be an RLC entity used when packet duplication is deactivated, or may be an RLC entity that is always activated. Configuration of the primary RLC may also be configured to the terminal by the base station through an RRC configuration or reconfiguration message. However, because repeatedly configuring the same information in the RRC configuration or reconfiguration message may cause an unnecessary overhead, the base station may transmit configuration information to the terminal only when packet duplication or a split bearer is initially configured (set up), the number of RLC entities configured in the radio bearer is changed, or the related configuration is changed.

Referring to FIG. 12, when the base station is to transmit an RRC configuration or reconfiguration message (or when the base station triggers or determines to transmit an RRC configuration or reconfiguration message) (operation 1210), the base station may need to determine at least one of whether the RRC configuration or reconfiguration includes the initial configuration of the SRB or the number of RLC entities of the corresponding SRB. When the information included in the RRC configuration or reconfiguration indicates that the SRB configured with two or more RLC entities is initially configured (set up) or the number of RLC entities of the SRB is changed (operation 1220), the base station should include the PDCP configuration in the configuration of the corresponding SRB and may transmit the same to the terminal (operation 1230). Only then, the primary RLC entity may be configured by the PDCP configuration. The configuration of the PDCP entity and the configuration of the primary RLC may also be required in the split SRB having two or more RLC entities, as well as in the case of packet duplication transmission.

When the SRB configured with two or more RLC entities is not initially configured and the number of SRB RLC entities is not changed, the base station may determine whether the configuration or other values that may be included in the PDCP configuration should be changed (operation 1240), and when it should be changed, the base station should include the PDCP configuration in the corresponding SRB configuration and may transmit the same to the terminal (operation 1230). When it need not be changed, the PDCP configuration may not be included in the corresponding SRB configuration (operation 1250).

In the embodiment of FIG. 12, when the terminal is to receive the RRC configuration or reconfiguration message (operation 1210), it may be necessary to determine at least one of whether the RRC configuration or reconfiguration includes the initial configuration of the SRB or the number of RLC entities of the corresponding SRB. When the information included in the RRC configuration or reconfiguration indicates that the SRB configured with two or more RLC entities is initially configured (set up) or the number of RLC entities of the SRB is changed, the PDCP configuration should be included in the configuration of the corresponding SRB and the terminal may determine and apply the PDCP configuration. The PDCP configuration should be included in the SRB configuration such that the primary RLC entity may be configured by the PDCP configuration. The configuration of the PDCP entity and the primary RLC may also be required in the split SRB having two or more RLC entities, as well as in the case of packet duplication transmission.

When the SRB configured with two or more RLC entities is not initially configured and the number of SRB RLC entities is not changed, the terminal may determine whether the configuration or other values that may be included in the PDCP configuration should be changed, and when it should be changed, the PDCP configuration should be included in the corresponding SRB configuration and the terminal may determine and apply the PDCP configuration. When it need not be changed, the PDCP configuration may not be included in the corresponding SRB configuration and the terminal may apply a default configuration value of the PDCP configuration.

Figure 13:
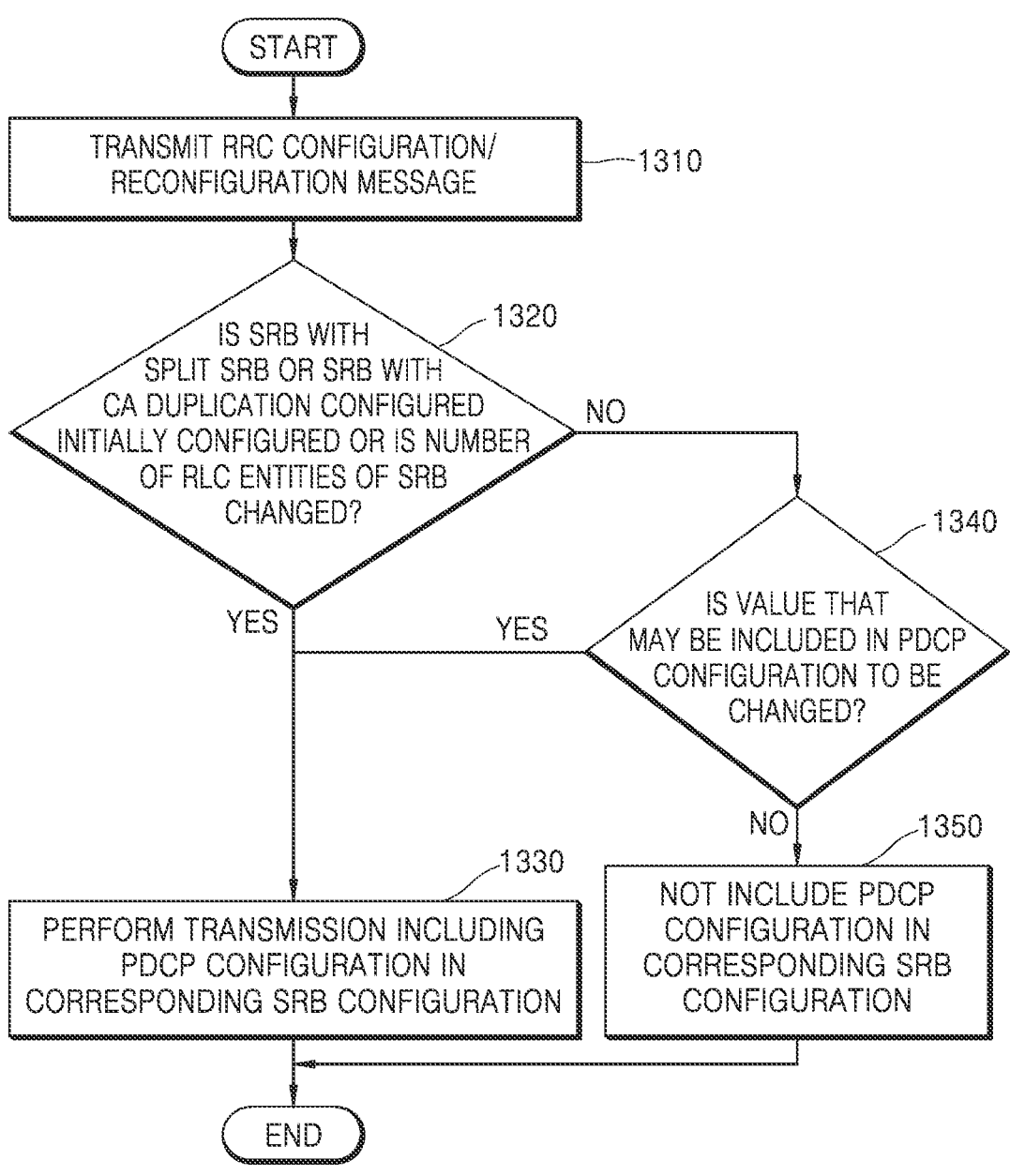
FIG. 13 illustrates an operation of transmitting PDCP configuration information of an SRB according to an embodiment of the disclosure.

FIG. 13 illustrates an operation of transmitting PDCP configuration information of an SRB according to an embodiment of the disclosure.

Referring to FIG. 13, radio bearers in which data is transmitted in an RAN meaning transmission between the base station and the terminal may be classified into SRBs and DRBs in which control information is transmitted, and packet duplication transmission may be configured for each radio bearer. However, two or more RLC entities should be configured with the corresponding radio bearer in order to perform packet duplication transmission. Thereafter, in order to perform actual packet duplication, two or more RLC entities should be activated to duplicately transmit the same packet to two or more RLC entities. Which RLC entity is to be activated may be configured to the terminal by the base station through an RRC configuration (setup) or reconfiguration message. In order to perform packet duplication transmission, it may be necessary to configure which RLC entity is a primary RLC entity. The primary RLC entity may be an RLC entity used to transmit a PDCP control PDU, may be an RLC entity used when packet duplication is deactivated, or may be an RLC entity that is always activated. Configuration of the primary RLC may also be configured to the terminal by the base station through an RRC configuration or reconfiguration message. However, because repeatedly configuring the same information in the RRC configuration or reconfiguration message may cause an unnecessary overhead, the base station may transmit the corresponding configuration information to the terminal only when packet duplication or a split bearer is initially configured (set up), the number of RLC entities configured in the radio bearer is changed, or the related configuration is changed.

Referring to FIG. 13, when the base station is to transmit an RRC configuration or reconfiguration message (or when transmission of an RRC configuration or reconfiguration message is triggered or the base station determines to transmit an RRC configuration or reconfiguration message) (operation 1310), the base station may need to determine at least one of whether the RRC configuration or reconfiguration includes the split SRB or the initial configuration of the SRB configured with carrier aggregation (CA) packet duplication or the number of RLC entities of the corresponding SRB. When the information included in the RRC configuration or reconfiguration indicates that the split SRB or the SR SRB configured with CA packet duplication is initially configured (set up) or the number of RLC entities of the SRB is changed (operation 1320), the base station should include the PDCP configuration in the configuration of the corresponding SRB and may transmit the same to the terminal (operation 1330). Only then, the primary RLC entity may be configured by the PDCP configuration.

The configuration of the PDCP entity and the configuration of the primary RLC may also be required in the split SRB having two or more RLC entities, as well as in the case of packet duplication transmission. Because an SRB configured with DC packet duplication among the SRBs configured with packet duplication is classified as a split SRB, the SRB configured with DC packet duplication may also be included in the case considered in operation 1320.

When the split SRB or the SRB configured with CA packet duplication is not initially configured and the number of SRB RLC entities is not changed, the base station may determine whether the configuration or other values that may be included in the PDCP configuration should be changed (operation 1340), and when it should be changed, the base station should include the PDCP configuration in the corresponding SRB configuration and may transmit the same to the terminal (operation 1330). When it need not be changed, the PDCP configuration may not be included in the corresponding SRB configuration (operation 1350).

Referring to FIG. 13, when the terminal is to receive the RRC configuration or reconfiguration message (operation 1310), it may be necessary to determine at least one of whether the RRC configuration or reconfiguration includes the initial configuration of the split SRB or the SRB configured with CA packet duplication or the number of RLC entities of the corresponding SRB. When the information included in the RRC configuration or reconfiguration indicates that the split SRB or the SR SRB configured with CA packet duplication is initially configured (set up) or the number of RLC entities of the SRB is changed, the PDCP configuration should be included in the configuration of the corresponding SRB and the terminal may determine and apply the PDCP configuration (operation 1330). The PDCP configuration should be included in the SRB configuration such that the primary RLC entity may be configured by the PDCP configuration.

The configuration of the PDCP entity and the primary RLC may also be required in the split SRB having two or more RLC entities, as well as in the case of packet duplication transmission. Because an SRB configured with DC packet duplication among the SRBs configured with packet duplication is classified as a split SRB, even in the case of the SRB configured with DC packet duplication, the terminal may determine whether the information included in the RRC configuration or reconfiguration indicates that the split SRB or the SR SRB configured with CA packet duplication is initially configured (set up) or the number of RLC entities of the SRB is changed. When the split SRB or the SRB configured with CA packet duplication is not initially configured and the number of SRB RLC entities is not changed, the terminal may determine whether the configuration or other values that may be included in the PDCP configuration should be changed, and when it should be changed, the PDCP configuration should be included in the corresponding SRB configuration and the terminal may determine and apply the PDCP configuration. When it need not be changed, the PDCP configuration may not be included in the corresponding SRB configuration and the terminal may apply a default configuration value of the PDCP configuration.

Figure 14:
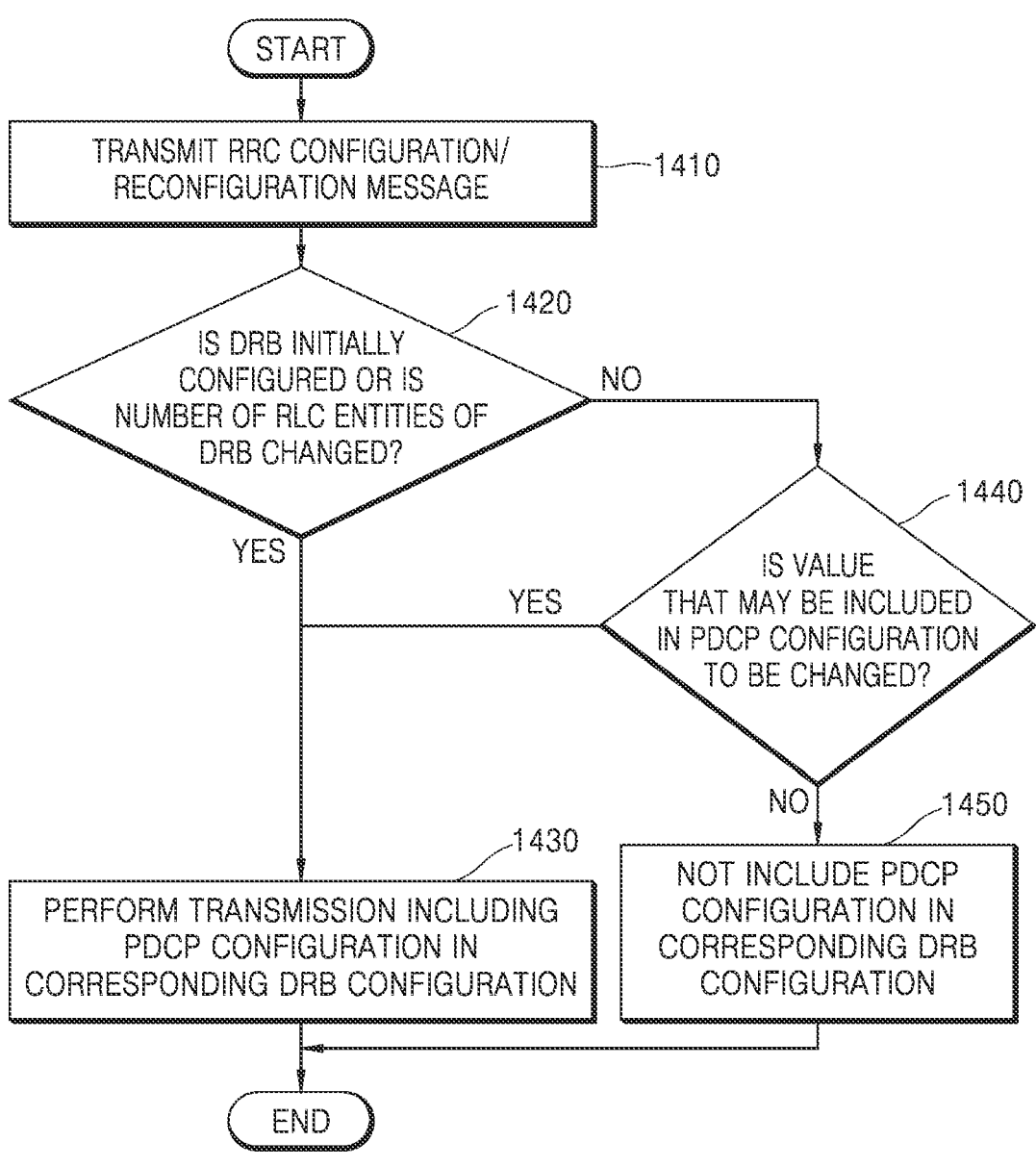
FIG. 14 illustrates an operation of transmitting PDCP configuration information of a data radio bearer (DRB) according to an embodiment of the disclosure.

FIG. 14 illustrates an operation of transmitting PDCP configuration information of a DRB according to an embodiment of the disclosure.

Referring to FIG. 14, radio bearers in which data is transmitted in an RAN meaning transmission between the base station and the terminal may be classified into SRBs and DRBs in which control information is transmitted, and packet duplication transmission may be configured for each radio bearer. However, two or more RLC entities should be configured with the corresponding radio bearer in order to perform packet duplication transmission. Thereafter, in order to perform actual packet duplication, two or more RLC entities should be activated to duplicately transmit the same packet to two or more RLC entities. Which RLC entity is to be activated may be configured to the terminal by the base station through an RRC configuration (setup) or reconfiguration message. In order to perform packet duplication transmission, it may be necessary to configure which RLC entity is a primary RLC entity. The primary RLC entity may be an RLC entity used to transmit a PDCP control PDU, may be an RLC entity used when packet duplication is deactivated, or may be an RLC entity that is always activated. Configuration of the primary RLC may also be configured to the terminal by the base station through an RRC configuration or reconfiguration message. However, because repeatedly configuring the same information in the RRC configuration or reconfiguration message may cause an unnecessary overhead, the base station may transmit configuration information to the terminal only when packet duplication or a split bearer is initially configured (set up), the number of RLC entities configured in the radio bearer is changed, or the related configuration is changed.

Referring to FIG. 14, when the base station is to transmit an RRC configuration or reconfiguration message (or when the base station triggers or determines to transmit an RRC configuration or reconfiguration message) (operation 1410), the base station may need to determine at least one of whether the RRC configuration or reconfiguration includes the initial configuration of the DRB or the number of RLC entities. When the information included in the RRC configuration or reconfiguration indicates that the DRB is initially configured (set up) or the number of RLC entities of the DRB is changed (operation 1420), the base station should include the PDCP configuration in the configuration of the corresponding DRB and may transmit the same to the terminal (operation 1430). Only then, the primary RLC entity and the PDCP configuration value may be configured by the PDCP configuration.

When the DRB is not initially configured and the number of RLC entities of the DRB is not changed, the base station may determine whether the configuration or other values that may be included in the PDCP configuration should be changed (operation 1440), and when it should be changed, the base station should include the PDCP configuration in the corresponding DRB configuration and may transmit the same to the terminal (operation 1430). When it need not be changed, the PDCP configuration may not be included in the DRB configuration (operation 1450).

In the embodiment of FIG. 14, when the terminal is to transmit an RRC configuration or reconfiguration message (operation 1410), it may be necessary to determine whether the RRC configuration or reconfiguration includes the initial configuration of the DRB and the number of RLC entities. When the information included in the RRC configuration or reconfiguration indicates that the DRB is initially configured (set up) or the number of RLC entities of the DRB is changed, the PDCP configuration should be included in the configuration of the corresponding DRB and the terminal may determine and apply the PDCP configuration. The PDCP configuration should be included in the DRB configuration such that the primary RLC entity and the PDCP configuration value may be configured by the PDCP configuration.

When the DRB is not initially configured and the number of RLC entities of the DRB is not changed, the terminal may determine whether the configuration or other values that may be included in the PDCP configuration should be changed, and when it should be changed, the corresponding DRB configuration should include the PDCP configuration and the terminal should determine and apply the PDCP configuration. Otherwise, the DRB configuration may not include the PDCP configuration and the terminal may maintain the previously configured DRB configuration value as it is.

The methods according to the embodiments of the disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored in a memory configured by a combination of some or all of such storage devices. In addition, each of the memories may be provided in plurality.

In addition, the programs may be stored in an attachable storage device that may be accessed through a communication network, such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. In addition, a separate storage device on a communication network may be connected to an apparatus performing an embodiment of the disclosure.

The described embodiment of the disclosure provides an apparatus and method capable of effectively providing services in a wireless communication system.

In the above particular embodiments of the disclosure, the components included in the disclosure are expressed in the singular or plural according to the particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:

receiving a radio resource control (RRC) message including configuration information for a plurality of radio link control (RLC) entities associated with one cell group;

identifying whether only one RLC entity is activated among the plurality of RLC entities of a data radio bearer (DRB) based on the RRC message;

identifying a cell for uplink data, not applying a restriction of allowed serving cell, while the restriction of allowed serving cell is maintained, in case that the only one of RLC entities is activated; and transmitting, to the cell, the uplink data based on the identified cell.

2. The method of claim 1, wherein the plurality of RLC entities are associated with a packet data convergence protocol (PDCP) entity for the DRB.

3. The method of claim 1, wherein information about allowed serving cell includes a list of available cells.

4. The method of claim 1, wherein the one cell group corresponds to one medium access control (MAC) entity.

5. The method of claim 1, wherein the RRC message includes information related to activation for a packet duplication of an RLC entity.

6. A terminal performed in a wireless communication system, the terminal comprising:

a transceiver; and at least one processor coupled with the transceiver and configured to:

control the transceiver to receive a radio resource control (RRC) message including configuration information for a plurality of radio link control (RLC) entities associated with one cell group, identify whether only one RLC entity is activated among the plurality of RLC entities of a data radio bearer (DRB) based on the RRC message, identify a cell for uplink data, not applying a restriction of allowed serving cell, while the restriction of allowed serving cell is maintained, in case that the only one of RLC entities is activated, and control the transceiver to transmit, to the cell, the uplink data based on the identified cell.

7. The terminal of claim 6, wherein the plurality of RLC entities are associated with a packet data convergence protocol (PDCP) entity for the DRB.

8. The terminal of claim 6, wherein information about allowed serving cell includes a list of available cells.

9. The terminal of claim 6, wherein the one cell group corresponds to one medium access control (MAC) entity.

10. The terminal of claim 6, wherein the RRC message includes information related to activation for a packet duplication of an RLC entity.

* * * * *